Nov. 4, 1969  N. M. PACKARD ET AL  3,476,099

HEAD, GASKET, PROTECTOR ASSEMBLY AND METHOD

Filed Feb. 26, 1968

Inventors:
Norman M. Packard
William Lenzi
By John W. Gaines
Atty.

United States Patent Office 3,476,099
Patented Nov. 4, 1969

3,476,099
HEAD, GASKET, AND PROTECTOR ASSEMBLY AND METHOD
Norman M. Packard, Des Plaines, and William Lenzi, Western Springs, Ill., assignors to International Harvester Company, Chicago, Ill., a corporation of Delaware
Filed Feb. 26, 1968, Ser. No. 708,394
Int. Cl. F02f 11/00
U.S. Cl. 123—193                                                18 Claims

ABSTRACT OF THE DISCLOSURE

Method of assembly of a head gasket protector with the other related engine parts in their environment of a combustion engine cylinder, and the resulting assembly. The protector is a thin walled metal band forming a fire barrier and, in pre-assembly, the band is press fitted in the mouth of the cylinder bore so as to project endwise beyond the engine cylinder. In final assembly with a cylinder head in place, the latter engages the projecting end of the protector as the head is drawn toward the bore mouth, and the protector is frictionally fixed in the mouth of the bore at a final depth to which the insert is forced by the head, as the head and cylinder are drawn tightly together against an interposed gasket which surrounds the protector and is perforce protected from the flame when combustion takes place in the cylinder.

---

This application relates to head gasket protection, i.e., it relates to protecting and thus rendering more efficient and lengthening the life of a gasket such as is commonly employed in internal combustion engines in the space between the head and cylinder members and encircling the mouth of the bore opening in each of the cylinder members in which the pistons of the engine are slidably mounted.

Head gaskets tend to deteriorate in high compression engines having very hot combustion temperatures. Combustion flame gets at the edges of the gasket and the deterioration is actually due to fire burning the gasket.

The problem is that prior barriers to protect a gasket against the fire have required many critical shim or other dimensions in order for accurate assembly to be accomplished without disturbing the seal of the compressible gasket.

The foregoing problem is materially reduced or substantially eliminated by the present inventions which eliminate critically, laboriousness, and time consumption in the assembly method and the finished assembly of the present protector within the environment of an engine, as will now be explained in detail.

Features, objects, and advantages will either be specifically pointed out or become apparent when, for a better understanding of the inventions, reference is made to the following description taken in conjunction with the accompanying drawing which shows certain preferred embodiments thereof and in which:

FIGURE 3 shows the elements just preliminary to having completed final assembly;

Figure 1:
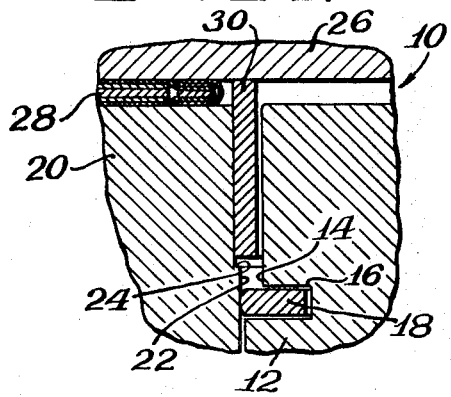
FIGURE 1 is a fragmentary sectional view in elevation of an engine head, gasket, and protector, in a final engine assembly embodying the inventions.

In the illustrative example of a piston engine 10 as shown in FIGURE 1 of the drawing, the reciprocable piston 12 appearing therein is of a type having a setback top land 14 which provides reduced or necked down diameter and which is prolongated longitudinally from the top of the piston to a point of intersection with a top ring groove 16. A conventional top compression ring 18 which surrounds the top of the piston fits in the groove 16.

An engine cylinder 20 has a main bore 22 receiving the piston 12 and a counterbore in the mouth of the cylinder extending to a moderately shallow depth therein so as to define a shoulder or base 24.

A cylinder head 26 is drawn down on the cylinder 20 at the mouth of the bore, and an interposed head gasket 28 which is disposed about the mouth of the bore is clamped between the head and cylinder in a compressed condition forming a high pressure seal.

Except when the piston 12 is at or near the top deadcenter position illustrated in FIGURE 1, the setback on the top land 14 defines an open annular orifice for freely conducting cylinder pressures freely downwardly to the top ring 18 to increase the gas loading for improved sealing and oil consumption. But the orifice effect is not essential at times, particularly at the times just mentioned when the piston is at or near top deadcenter.

At such particular times, the presence of an endless metal band or insert 30 will in no way interfere with anything then being sought and, if in fact applied right, the band can form a cylinder insert affording a dual function at those particular times. The band 30 has end abutting relation with and offers a resisting force to the head 26, and is received in the mouth of the cylinder head 26, and is received in the mouth of the cylinder with an interference fit with the counterbore but without end abutting relationship therewith.

To accomplish one thing, the band 30 projects radially inwardly from the bore surface to provide appreciably reduced cylinder cross sectional area through which the setback top land 14 of the piston passes with only restricted clearance. Preferably, the counterbore and insert stop short of, but in closely spaced adjacency to, the uppermost point of travel of the top ring 18. The metal of the band nearly completely fills the otherwise empty annular orifice caused by the setback, thus avoiding wasted piston end clearance volume not directly exposed to fuel. Such an unoccupied, remote annulus or pocket of combustion space would, in the case of a diesel engine for example, be wholly outside of the injection spray range and prevent the injected fuel from properly mixing with all air in the combustion space for efficient combustion. For this function, the insert can be re-used again and again following overhauls of the engine.

To accomplish another thing, the band 30 by projecting longitudinally outwardly from the bore so as to bridge the space between the cylinder and head and abut the latter, forms not truly a seal but certainly a fire barrier effectively protecting the edges of the gasket 28 from direct combustion flame. The gasket 28, which is conventional, perforce has longer life because of freedom from direct burning. For this function, too, the insert can be re-used again and again.

Figure 2:
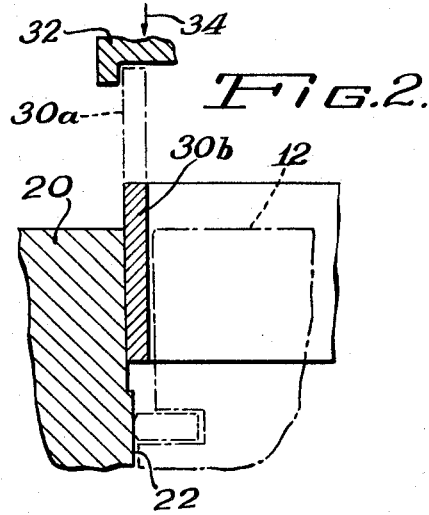
FIGURES 2 and 3 are similar to FIGURE 1, except that FIGURE 2 shows the elements in pre-assembly
Figure 3:
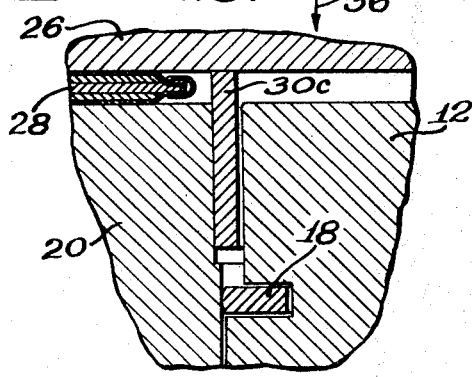

The method of assembly, the final assembly having been completed as shown in FIGURE 1, can be followed according to the pre-assembly sequence as shown in FIGURE 2 and the partially completed final assembly sequence as shown in FIGURE 3.

More particularly in FIGURE 2, the cylinder 20 and the band are aligned in a press with a press fixture 32, which fixture engages the band with the band initially occupying the remote position as shown by the broken lines 30a in FIGURE 2. A press indicated schematically by an arrow 34 and acting in the direction or the arrow up on the press fixture 32, forces the band into a pre-assembly position 30b, as shown by solid lines in FIGURE 2, as an insert in the mouth of the cylinder somewhat deeply into the counterbore.

The actual depth is not critical, so long as the band or insert in the position 30b at its upstanding end is sustained at a level that will be approximately at or above the top of the gasket uncompressed. To the scale actually illustrated, the insert will stand above the gasket when the latter is installed on the cylinder block. By preferred practice the piston, appearing in the broken lines 12 in FIGURE 2, is first installed in the cylinder bore 22 and then the gasket is applied to the cylinder about the mouth of the bore.

FIGURE 3 shows the progress of final assembly, nearing completion after the gasket 28 has been installed and the head 26 has engaged and forced down the insert 30 to a point where the head first contacts the top of the gasket 28 uncompressed. Head hold-down means schematically indicated by an arrow 36 and acting in the direction of the arrow are tightened to draw down the head in conventional way.

Continued drawing together of the cylinder block and head 20 and 26 from their relative position as shown in FIGURE 3 forces the insert to shift bodily to a final depth in the counterbore at which it is left frictionally fixed, as and when the interposed gasket has been compressed to its normal installed thickness as illustrated in FIGURE 1. The head 26 meets simultaneous resistance in the process, from the seal 28 as it is crushed thinner and from the abutting insert 30 as the friction grip of the cylinder thereon is being overcome and caused to slip. It is apparent that if the insert 30 is machined with any degree of care, there is no criticality whatsoever in the assembly operation and that the required effective sealing can be achieved with no interference or complications.

Figure 4:
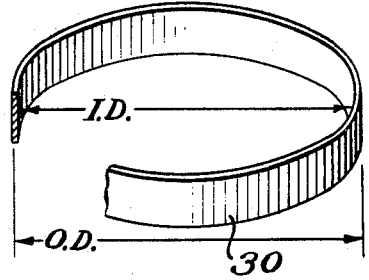
FIGURE 4 is an isometric view of the protector.

Because the band 30 as shown in FIGURE 4 becomes an insert in use, its dimensions depend upon the immediate environmental parts. The selected inside diameter, indicated by I.D., is such as to provide the restricted clearance, hereinabove indicated, with the setback top land 14 of the piston after the piston has reached full operating temperature. The outside diameter, indicated O.D., is selected such as to provide an interference fit in all positions within the counterbore, so that both in pre-assembly as shown according to FIGURE 2 or in final assembly as shown according to FIGURE 1, the band frictionally takes a self-fixed insert position and remains immovable unless a heavy longitudinal displacing force is applied thereto.

Finally, in comparison to the end for end length of the band, indicated as the height H in FIGURE 4, the counterbore at the mouth of the cylinder is machined to a predetermined depth such that, from the shoulder 24 at the bottom to the top of the gasket 28, the resulting height dimension is at all times materially greater than the referred to insert height H. Thus the forcing, by force of the cylinder head 26 as it is drawn down in final assembly, of the insert to the final depth as shown in FIGURE 1 never causes the insert 30 to close up the permanent gap appearing between the insert at the bottom end and the shoulder 24 at that end. The gasket 28 therefore becomes no critical factor in terms of the amount to which it is able to compress in order to provide the proper sealing.

In practice, the band 30 has a wall height H to wall thickness ratio of at least about 8:1. Obviously, much lower ratios can be used in instances of more exaggerated setback of the top land 14 than presently illustrated.

Although as indicated the insert 30 is never pressed to such an excessive depth at which it will take up all of the vertical gap across to the shoulder 24, the shoulder 24 is nonetheless desirable if not essential in insuring that the insert 30 in no way intereferes with the top piston ring 18 as a metal obstruction thereto.

Figure 5:
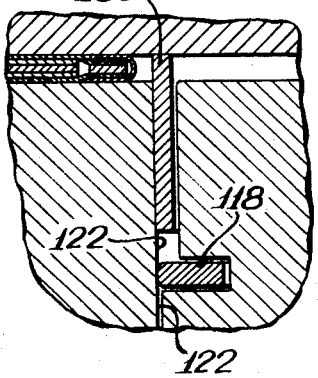
FIGURES 5 and 6 are two showings like FIGURE 1, but showing two respective modifications.

However, if the manufacturer has an overriding preference to omit the counterboring as an avoidable machine operation, he can still utilize the principles of our inventions even though he provides a uniform bore 122 in the cylinder as shown in FIGURE 5. As thus shown, a cylinder insert 130 does not have at the bottom end a confronting counterbore shoulder provided in the bore 122 at that end as absolute insurance against interference with a piston top ring 118.

Figure 6:
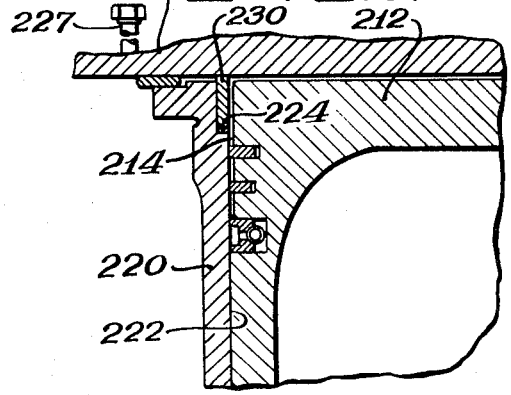

If the manufacturer employs a piston 212 which, as shown in the modification of FIGURE 6, has no setback of the top land 214 when the piston is at full operating temperature, then a cylinder bore 222 in which the piston 212 reciprocates has uniform inside diameter throughout the length including the cylinder extension or prolongation provided by an insert 230. Again, a shoulder 224 of a counterbore receiving the insert 230 is spaced far enough apart from the insert in the way already described to provide a permanent gap. In other words, the counterbore and insert are in the same way operatively related, with the counterbore perceptibly projecting at one end beyond the corresponding end of the insert, and vice versa. The gap at 224 is made more than infintesimal to enable a removal tool to be inserted in case the insert 230 must be removed.

In FIGURE 6, the bore 222 is illustratively shown as formed within the inner component of a two-component cylinder, namely, within a cylinder liner or sleeve component 220 which tightly fits in conventional way within a cylinder block component, not shown. In all cases, the insert and bore will be compatible metals having about the same temperature coefficient of expansion. For use in a cast iron liner, for example, the insert will usually be made of cast iron.

For purposes of our inventions, it is immaterial whether or not the cylinder block is of the type requiring liners, the value being to provide replacibility. The pistons are conventional except as otherwise noted. The ones actually illustrated are for diesel engines, being the so-called Mexican hat type having combustion dishes, not shown, recessed centrally in the top of the piston crown.

A head 226 is fragmentarily shown in the modification of FIGURE 6, and also head hold-down means of which an exemplary head bolt 227 appears. The lock washer for the bolt does not appear and neither does the cylinder block in which the bolt is threadably lodged after it is passed down through an appropriate bolt opening in the head 226.

From the foregoing, it is apparent that there is no criticality involved in the final assemblies illustrated in FIGURES 1, 5, or 6 foregoing, either in the assembly structure itself or in the steps of accomplishing the assembly thereof. That is to say, no close tolerances or predetermined highly accurate thicknesses of gasket or shimming becomes in any manner critical to the practicing of our inventions. The reason is the veritable infinity of vertical levels at which the insert can readily become frictionally fixed in the mouth of the cylinder bore, for self-adjustment to accommodate to whatever the movement of seal collapse amounts to during tightening of the head.

For re-use following a service take-down of the engine, the insert is simply re-raised to the so-called pre-assembly position 30b of FIGURE 2 by means of a gear puller or bushing puller. Final assembly is then repeated, with a new gasket 28 applied.

Variations within the spirit and scope of the inventions described are equally comprehended by the foregoing description.

What is claimed is:

1. In an internal combustion engine including a cylinder having a bore, a drawn-down head on the cylinder at the mouth of the bore and having head hold-down means to hold the head tightly drawn down, and an interposed compressible gasket disposed about the mouth of the bore and engaged between the cylinder and head to establish therewith a sealed operative relation desired:

the combination with said cylinder, head, hold-down means, and gasket engaged in the operative relationship described;

of an improvement in gasket protection, characterized by the cylinder having an interference fit insert in an available receiving portion of the bore mouth, bridging the space between the adjacent faces of the cylinder and drawn-down head inwardly of the gasket to form a protective fire barrier for same;

said cylinder insert abutting the head with a resisting force thereagainst and being frictionally fixed in the mouth of the bore at a final depth to which the insert is forced by the head as the head and cylinder are drawn tightly against the interposed gasket, said available receiving portion length plus the thickness of the compressed gasket on assembly exceeding the height of the insert.

2. The invention of claim 1, the cylinder insert characterized by a metal band.

3. The invention of claim 2, characterized by the cylinder being of generally uniform inside diameter throughout.

4. The invention of claim 2, the band characterized by a wall height to wall thickness ratio of at least about 8:1.

5. The invention of claim 3, characterized by the bore proper and the insert having approximately the same inside diameter.

6. The invention of claim 3, characterized by the bore ID and the insert OD differing not more than to structurally interfere at their mating surfaces when press fit together.

7. The invention of claim 1, the available receiving portion characterized by a counterbore in the mouth of the cylinder having an interference grip on the insert, the counterbore surface and the insert surface which are gripped one on the other being compatible materials to prevent the counterbore under thermal expansion from releasing said grip.

8. The invention of claim 7, the bore and the insert characterized by approximately the same ID.

9. In an internal combustion engine which includes operatively related elements comprising a cylinder having a bore, a drawn-down head on the cylinder at the mouth of the bore, an interposed compressible gasket disposed about the mouth of the bore and engaged between and sealing the cylinder and head, and a piston passing to and fro in the bore having a setback top land:

the combination with said operatively related elements and with means supporting said elements in the engine in the operative relationship described;

of improved means of gasket protection, characterized by the cylinder having a diameter-reducing, pressed-in insert inwardly of the gasket to form a protective fire barrier for same;

said cylinder-diameter-reducing insert projecting radially inwardly from the bore surface to provide appreciably reduced cylinder cross sectional area through which the setback top land of the piston passes with only restricted clearance;

said cylinder-diameter-reducing insert projecting longitudinally outwardly from the bore so as to bridge the space between the adjacent faces of the cylinder and drawn-down head, in a manner abutting the head with a resisting force thereagainst and being frictionally fixed in the mouth of the bore at a final depth to which the insert is forced by the head when the head and cylinder are drawn tightly against the interposed gasket.

10. The invention of claim 9, characterized by a counterbore in the mouth of the cylinder having an interference fit with the insert, said counterbore and insert operatively related with the counterbore perceptibly projecting at one and beyond the corresponding end of the insert.

11. The invention of claim 10, in which not only the counterbore has the operative relationship described, to the insert at one end, but also vice versa.

12. In the method of assembly of a cylinder having a bore, a downwardly drawable head on the cylinder at the mouth of the bore having head hold-down means to draw down upon and hold the head tightly drawn down, an interposed compressible gasket disposed about the mouth of the bore so as to be engageable between and seal the cylinder and head in final assembly, and a press fit insert in the cylinder, adapted to protect the gasket by bridging the space between the adjacent faces of the cylinder and drawn-down head inwardly of the gasket thereby forming a fire barrier for same, the criticality-free steps comprising:

forcing, by pre-assembly press fit, the insert to slidingly move down to a preliminary depth in an available receiving portion of the mouth of the cylinder bore whereby the insert at its upstanding end is sustained at least approximately as high as the top of the gasket; and further forcing, by force of the cylinder head as it is drawn down in final assembly, the insert to slidingly move down to a final depth at which it is fixed by interference fit within the available receiving portion in the bore of the cylinder, as and when the interposed gasket has been compressed to its normal installed thickness, said available receiving portion length plus the thickness of the gasket when compressed as aforesaid exceeding the height of the insert.

13. The invention of claim 12, the insert characterized by a cylindrical band having a wall height to wall thickness ratio of at least about 8:1.

14. Means which define a combustion chamber end provided with a flame barrier, comprising:

a cylinder having at the mouth a cylindrical end portion of substantially uniform inside diameter;

a cylinder head confronting the cylinder in spaced apart relation to the mouth; and an endless insert gripped in the mouth of the cylinder;

said insert extending at one end beyond the uniform diameter end portion of the cylinder into bridging engagement across said space and abutted against the head, and said uniform diameter end portion extending at one end beyond the corresponding end of the insert.

15. The invention of claim 14, further comprising a head gasket susceptible to burning, clamped in compression between the cylinder and head, and encircling the periphery of the insert so as to be protected by the insert from burn damage.

16. The invention of claim 15, said mouth of the cylinder and said endless insert therein having a mutual interface of engagement, of which the shape is a cylinder of generally uniform diameter and by which the mouth of the cylinder frictionally grips the insert.

17. In an internal combustion engine including a cylinder having a bore, a drawn-down head on the cylinder at the mouth of the bore and having head hold-down means to hold the head tightly drawn down, and an interposed compressible gasket disposed about the mouth of the bore and engaged between the cylinder and head to establish therewith a sealed operative relation desired:

the combination with said cylinder, head, hold-down means, and gasket engaged in the operative relationship described;

of an improvement in gasket protection, characterized by the cylinder having a press fit insert bridging the space between the adjacent faces of the cylinder and drawn-down head inwardly of the gasket to form a protective fire barrier for same;

said cylinder insert abutting the head with a resisting force thereagainst and being frictionally fixed in the mouth of the bore at a final depth to which the insert is forced by the head as the head and cylinder are drawn tightly against the interposed gasket;

a counterbore in the mouth of the cylinder characterized by an inference fit with the insert, and the insert characterized by a materially smaller ID than the bore.

18. In an internal combustion engine including a cylinder having a bore, a drawn-down head on the cylinder at the mouth of the bore and having head hold-down means to hold the head tightly drawn down, and an interposed compressible gasket disposed about the mouth of the bore and engaged between the cylinder and head to establish therewith a sealed operative relation desired:

the combination with said cylinder, head, hold-down means, and gasket engaged in the operative relationship described;

of an improvement in gasket protection, characterized by the cylinder having a press fit insert bridging the space between the adjacent faces of the cylinder and drawn-down head inwardly of the gasket to form a protective fire barrier for same;

said cylinder insert abutting the head with a resisting force thereagainst and being frictionally fixed in the mouth of the bore at a final depth to which the insert is forced by the head as the head and cylinder are drawn tightly against the interposed gasket;

a counterbore in the mouth of the cylinder characterized by having an interference fit with the insert, and the insert in its height dimension from bottom to top characterized by being at all times materially shorter than the total height from the bottom of the counterbore to the top of the gasket.

References Cited

UNITED STATES PATENTS

| | | | |
|---|---|---|---|
| 3,340,774 | 9/1967 | Brenneke | 92—171 |
| 2,744,514 | 5/1956 | Uidmar. | |

FOREIGN PATENTS 1,066,721   1/1954   France.

WENDELL E. BURNS, Primary Examiner

U.S. Cl. X.R.

92—171